No. 638,339. Patented Dec. 5, 1899.
T. M. JEFFERSON.
PORTABLE WATER SUPPLY RESERVOIR.
(Application filed Apr. 21, 1899.)

(No Model.)

Witnesses:
Geo. W. Naylor
M. G. McLean

Inventor
Thomas Michael Jefferson,
By his Attorneys
Clara Deemer & Co.

THE NORRIS PETERS CO., PHOTO-LITHO., WASHINGTON, D. C.

UNITED STATES PATENT OFFICE

THOMAS MICHAEL JEFFERSON, OF BUFFALO, NEW YORK.

PORTABLE WATER-SUPPLY RESERVOIR.

SPECIFICATION forming part of Letters Patent No. 638,339, dated December 5, 1899.

Application filed April 21, 1899. Serial No. 713,847. (No model.)

*To all whom it may concern:*

Be it known that I, THOMAS MICHAEL JEFFERSON, a citizen of the United States, and a resident of Buffalo, county of Erie, and State of New York, have invented certain new and useful Improvements in Portable Water-Supply Reservoirs, of which the following is a specification, reference being had to the accompanying drawings, forming a part thereof, in which similar letters and figures of reference indicate corresponding parts.

This invention relates to improvements in fire-extinguishing apparatus; and the object thereof is to provide concentrated streams of maximum force and size from remote sources of supply by use of a minimum of motive power.

The invention embodies a portable reservoir of novel construction, which will be hereinafter fully described, and specifically set forth in the annexed claims.

Figure 1:
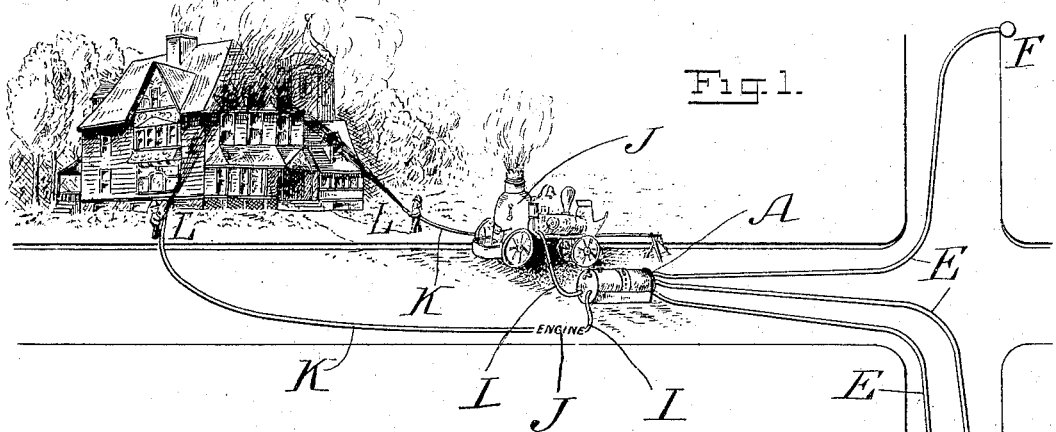
Figure 2:
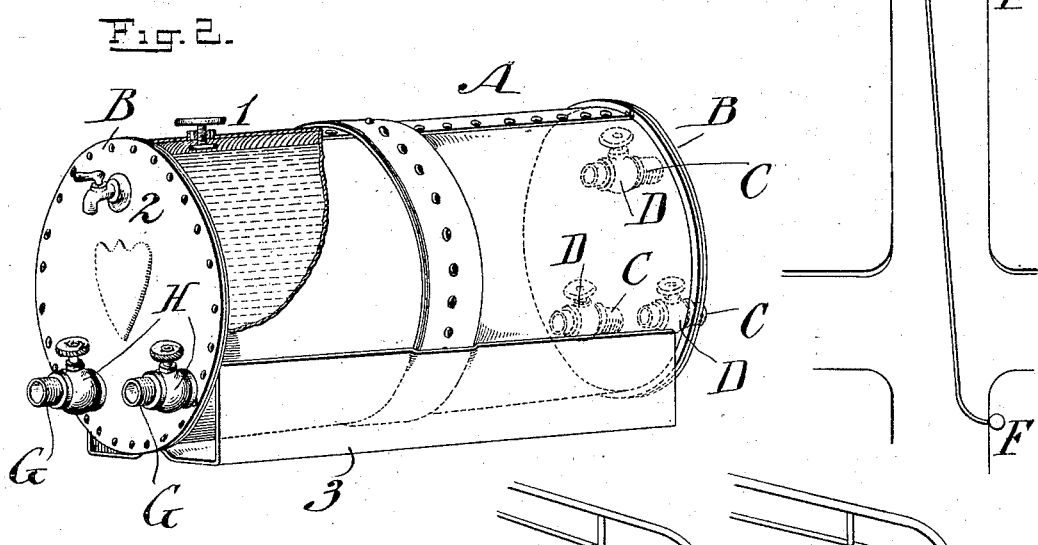
Figure 3:
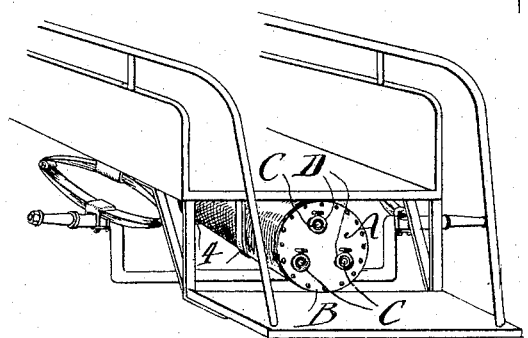

In the accompanying drawings, forming part of this specification, Figure 1 is a diagrammatic view illustrating the application of my improved invention. Fig. 2 is a perspective view of my portable reservoir, and Fig. 3 is a similar view illustrating a slight modification.

In the practice of my invention I employ a reservoir of adapted proportions and contour, composed of steel or other suitable material.

In the drawings the reservoir comprises the cylinder A, having a closed head B at each end thereof; but it is obvious that under the scope of my invention I am entitled to adapted variations of structure and contour. Communicating with the reservoir through one of its heads B is a plurality of inlet-tubes C, having valves D connected therewith. These tubes are adapted for connection with lines of hose E, as illustrated by Fig. 1 of the drawings, each line of hose being connected to a fire-plug F, which may be located at a remote distance from the fire.

Leading from the opposite head B are outlet-tubes G of about the same capacity, but of lesser number than the tubes C, which have valves H connected therewith and which are adapted for connection with lines of hose I, leading to pumping-engines J, which are in turn connected with lines of hose K for supplying streams of water to a burning building, as at L. Any required number of inlet and outlet tubes may be employed, the number of inlet-tubes always exceeding the number of outlet tubes—as, for instance, three inlet-tubes and two outlet-tubes, as shown by the drawings. The inlet and outlet tubes may lead to and from the side walls of the reservoir, if desirable, or both end and side walls of said reservoir may be provided with supply and discharge tubes to meet the requirements of certain conditions.

The reservoir is supplied with an air vent or valve, as at 1, and a faucet or water-gage, as at 2, and it is preferably mounted upon a suitable standard 3, or it may be carried upon the hose-truck and suspended therefrom by means of hangers 4, as illustrated by Fig. 3 of the drawings.

In practice any suitable number of hose-lines may be led to the reservoir from remote fire-plugs or other sources of supply and any proportionate number of engines can be connected to the discharge-tubes, and it is obvious that by interposing this reservoir between the engines and source of supply a lesser number of engines will be required than would be the case if they were connected directly to the fire-plugs, and streams of maximum force are supplied by use of a minimum of motive power.

Having thus described my invention, what I claim as new, and desire to secure by Letters Patent, is—

1. In a fire-extinguishing apparatus, the combination with a pumping-engine, of a portable reservoir separate from and independent of the engine and located between the said engine and the source of water-supply, said reservoir having a plurality of inlets and a plurality of outlets which are of lesser capacity than the inlets, and lines of hose connecting the reservoir inlets and outlets respectively with the source of supply and with the engine, substantially as shown and described.

2. As a fire-extinguishing apparatus, the combination with pumping-engines and sources of water-supply of a portable reservoir having valved inlets leading thereto and valved outlets leading therefrom the outlets being of lesser capacity than the inlets, with lines of hose engaging said valved inlets and outlets and connected respectively with the sources of supply and pumping-engines, substantially as shown and described.

3. As a fire-extinguishing apparatus, the combination of pumping-engines and sources of water-supply and a portable reservoir having valved inlets leading thereto and valved outlets leading therefrom adapted for engagement with lines of hose the outlets being of lesser capacity than the inlets, the reservoir being supplied with an air vent or valve and with a water-gage, and lines of hose detachably engaging said valved inlets and outlets and adapted respectively for connection with said sources of supply and pumping-engines, substantially as shown and described.

In testimony that I claim the foregoing as my invention I have signed my name, in presence of two witnesses, this 17th day of April, 1899.

THOMAS MICHAEL JEFFERSON.

Witnesses:
EDWIN BUNNY.
CARLTON STRONG.